(12) United States Patent  (10) Patent No.: US 7,907,515 B2
Fukasawa  (45) Date of Patent: Mar. 15, 2011

(54) NETWORK INTERFACE SWITCHING IN MULTI-INTERFACE APPARATUS

(75) Inventor: Nobuaki Fukasawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 450 days.

(21) Appl. No.: 11/689,062

(22) Filed: Mar. 21, 2007

(65) Prior Publication Data

US 2007/0230332 A1  Oct. 4, 2007

(30) Foreign Application Priority Data

Mar. 30, 2006 (JP) ................................. 2006-094623

(51) Int. Cl.
*G01R 31/08* (2006.01)
*H04L 12/66* (2006.01)

(52) U.S. Cl. .......................... 370/216; 370/463; 707/684

(58) Field of Classification Search .......... 370/216–220, 370/252, 254, 463–465; 707/200–204, 640, 707/645, 655, 674–680, 684

See application file for complete search history.

(56) References Cited

U.S. PATENT DOCUMENTS

| 6,032,194 | A  | * | 2/2000 | Gai et al. ...................... 370/217 |
| 7,130,870 | B1 | * | 10/2006 | Pecina et al. .................. 707/203 |
| 7,391,719 | B2 | * | 6/2008 | Ellis et al. ..................... 370/219 |
| 2003/0016624 | A1 | * | 1/2003 | Bare ............................ 370/217 |
| 2005/0128952 | A1 | * | 6/2005 | Challener et al. ............. 370/241 |
| 2007/0047436 | A1 | * | 3/2007 | Arai et al. ..................... 370/219 |
| 2007/0143391 | A1 | * | 6/2007 | Nakamura .................... 709/200 |

FOREIGN PATENT DOCUMENTS

JP  05-216597 A  8/1993

* cited by examiner

*Primary Examiner* — Aung S Moe
*Assistant Examiner* — Kerri M Rose
(74) *Attorney, Agent, or Firm* — Rossi, Kimms & McDowell LLP

(57) ABSTRACT

An apparatus capable of performing, without the apparatus being isolated from a network, automatic switching to a previous network interface if there is an error in setting set values for a different network interface to which the previous network interface has been switched. When set values for a first network interface, which can be used in the apparatus, have been changed and then processing to establish connection to a network using the first network interface as active network interface in the apparatus has failed, the active network interface is switched to a second network interface which can be used in the apparatus.

6 Claims, 10 Drawing Sheets

NETWORK INTERFACE SWITCHING IN MULTI-INTERFACE APPARATUS

BACKGROUND OF THE INVENTION

1. Field of the Invention

The present invention relates to an apparatus such as a printer, a network configuration method for the apparatus, and a computer-readable control program for causing a computer to execute the network configuration method.

2. Description of the Related Art

Conventionally, there have been known electronic apparatuses having a plurality of network interfaces. In some electronic apparatuses of this type, network interfaces are exclusively controlled so as to selectively use a desired one of the network interfaces. Also known is an electronic apparatus capable of automatically selecting a network interface to be used (see for example, Japanese Laid-open Patent Publication No. H05-216597).

Some of electronic apparatuses of the aforesaid type having a plurality of network interfaces have a built-in wired network interface and are adapted to be mounted with a wireless network expansion card. In these apparatuses, the wired network interface and the wireless network interface are exclusively used. In the following, an explanation will be given of an electronic apparatus having a wired network interface and a wireless network interface that are respectively comprised of a wired LAN (Local Area Network) interface and a wireless LAN interface.

For electronic apparatuses of the type having a built-in wired LAN and a wireless LAN expansion card mounted thereon, a remote user interface (remote UI) connected to the wired LAN interface is sometimes used for setting set values for the wireless LAN. In particular, the settings of set values in electronic apparatuses such as printers which are insufficient in usability of a local user interface (local UI) are performed using the remote UI. In that case, the remote UI is used, in succession, to make the settings of the set values for the wireless LAN and switch the network interface to be used (hereinafter referred to as the active network interface) from the wired LAN to the wireless LAN.

However, a user can sometimes erroneously set the set values for the wireless LAN. Beside, in general the user can be aware of the erroneous setting only after the wireless LAN interface fails to establish connection to a wireless LAN access point, resulting in a state that the electronic apparatus is unable to connect both the wired LAN and the wireless LAN because of the exclusive control being carried out to determine the active network interface.

In order to restore from this state, the set values must be changed using the local UI. Even if the remote UI is absolutely used to change the set values, it is necessary to use the local UI to change the active network interface to the wired LAN interface and then use the remote UI to change the set values. This causes inconveniences.

SUMMARY OF THE INVENTION

The present invention provides an apparatus capable of performing, without the apparatus being isolated from a network, automatic switching to a previous network interface if there is an error in setting a set value for a different network interface to which the previous network interface has been switched, and a network configuration method for the apparatus and a computer-readable control method for causing a computer to execute the network configuration method.

According to a first aspect of the present invention, there is provided an apparatus in which a plurality of network interfaces including a first and a second network interface can be used, the apparatus comprising a changing device arranged to change at least one set value for the first network interface, a first interface switching device arranged to switch an active network interface in the apparatus to the first network interface, a connection processing device arranged to perform processing to establish connection to a network using the first network interface, and a second interface switching device arranged to switch the active network interface in the apparatus to the second network interface in a case that the set value for the first network interface has been changed by the changing device and the processing to establish connection to the network by the connection processing device has failed.

According to a second aspect of the present invention, there is provided a network configuration method for an apparatus in which a plurality of network interfaces including a first and a second network interface can be used, the method comprising a changeover step of changing at least one set value for the first network interface, a first interface switching step of switching an active network interface in the apparatus to the first network interface, a connection processing step of performing processing to establish connection to a network using the first network interface, and a second interface switching step of switching the active network interface in the apparatus to the second network interface in a case that the set value for the first network interface has been changed in the changeover step and the processing to establish connection to the network in the connection processing step has failed.

According to a third aspect of the present invention, there is provided a computer-readable control program for causing a computer to execute the network configuration method according to the second aspect of this invention.

According to the present invention, it is possible to make automatic switching to a previous interface without the apparatus being isolated from a network, even if there is an error in setting at least one set value for a different network interface to which the active network interface in the apparatus has been changed from the previous interface, whereby the erroneous setting can be corrected using the previous interface.

Further features of the present invention will become apparent from the following description of exemplary embodiments with reference to the attached drawings.

DESCRIPTION OF THE EMBODIMENTS

The present invention will now be described in detail below with reference to the drawings showing a preferred embodiment thereof.

[Configuration of Network System]

Figure 1:
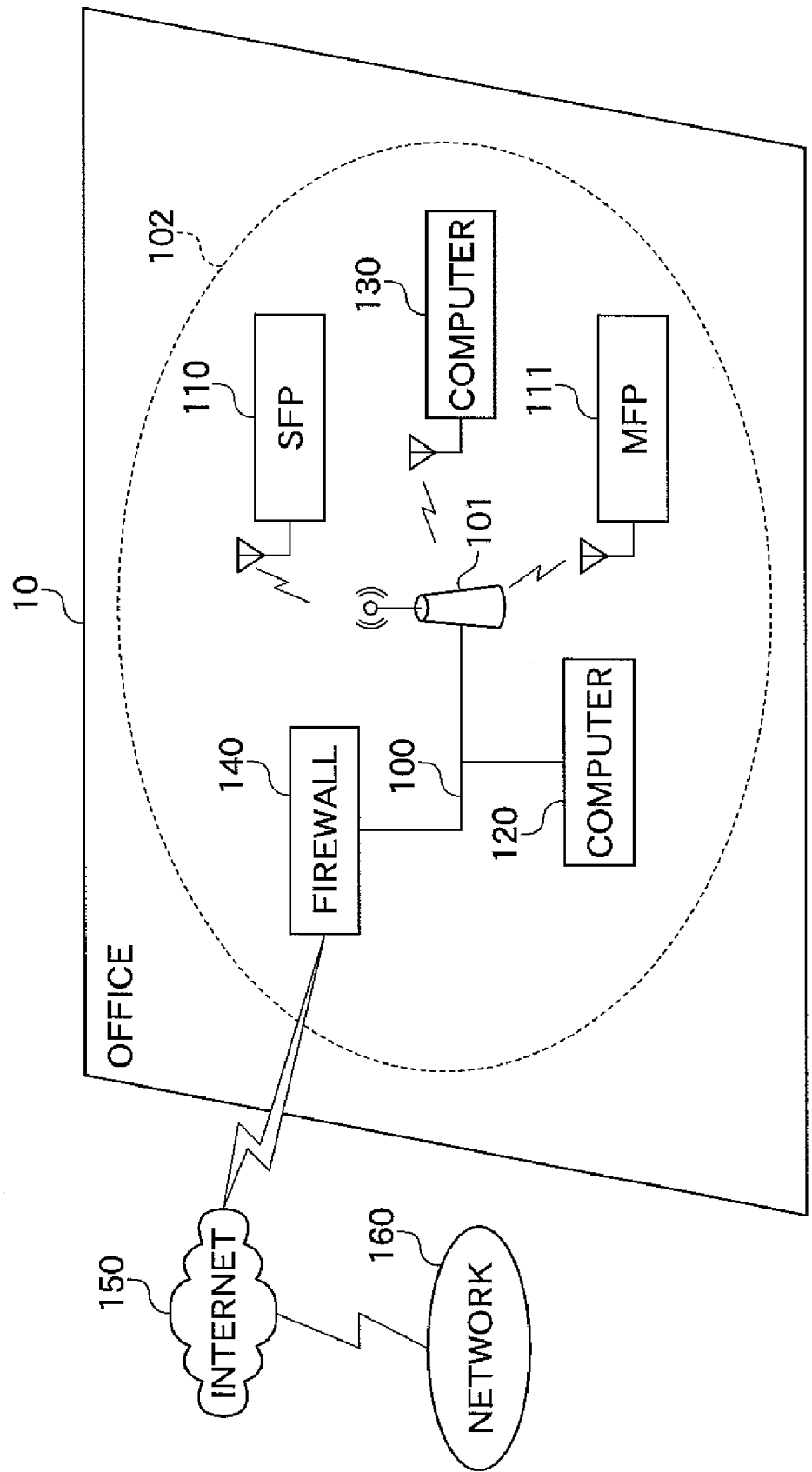
FIG. 1 is a block diagram showing the configuration of a network system having an electronic apparatus according to an embodiment of the present invention.

FIG. 1 is a block diagram showing the configuration of a network system having an electronic apparatus according to an embodiment of the present invention.

This network system, which is installed, for example, in an office 10, is comprised of a wireless LAN 102 and a wired LAN 100, and includes as an electronic apparatus a single-function printer (SFP) 110 or a multi-function printer or peripheral (MPF) 111. The wired LAN 100 can be connected to the wireless LAN 102 and can be connected to an external network 160 via the Internet 150.

In the office 10, there are provided the SFP 110, the MPF 111, and a first personal computer (hereinafter referred to simply as the first computer) 130, which are connected to an access point 101 of the wireless LAN 102. The wired LAN 100 is connected to the access point 101. A second personal computer (second computer) 120 and a firewall 140 are connected to the wired LAN 100.

The firewall 140 connects the wired LAN 100 to the Internet 150. The wired LAN 100 is connected to a different network 160 via the firewall 140 and the Internet 150.

The SFP 110 and the MPF 111 are each arranged to receive a print job from the first computer 130 via the wireless LAN 102 and execute print processing. Further, the SFP 110 and the MPF 111 receive requests for configuration and operation from the first computer 130, and operate according to the requests. Thus, they can remotely be configured and operated.

The SFP 110 and the MPF 111 receive a print job also from the second computer 120 via the wired LAN 100 and the wireless LAN 102 and execute print processing. In addition, the SFP 110 and MPF 111 are configured to receive requests for configuration and operation from the second computer 120 and operate according to the requests, whereby they can remotely be configured and operated also from the second computer 120.

The firewall 140 is provided between the Internet 150 and the wired LAN 100 for security in the office 10. The firewall 140 permits predetermined communication methods and access from the particular other party of communication, but rejects all other communications.

[Internal Construction of Computer]

Figure 2:
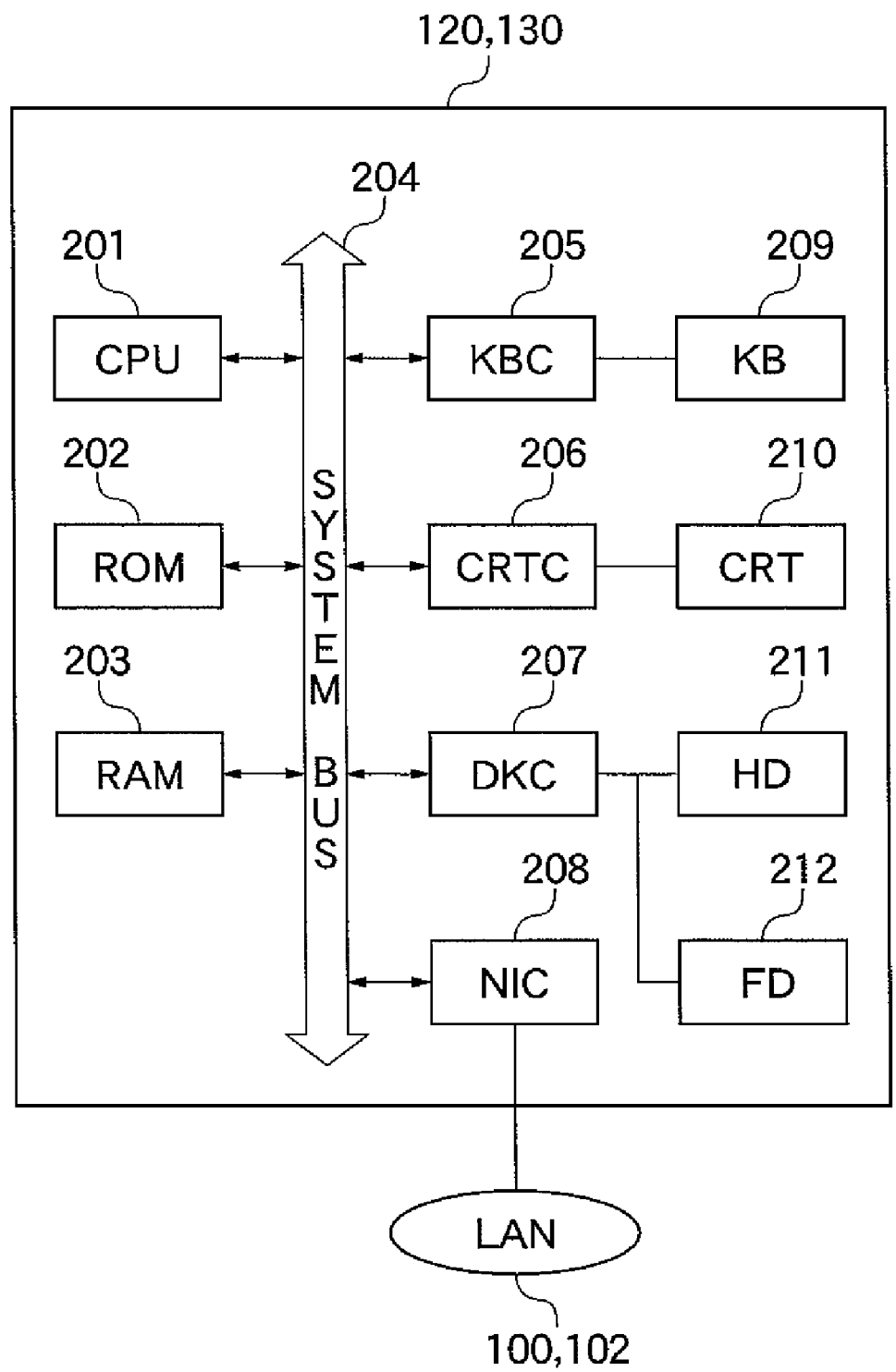
FIG. 2 is a block diagram showing an example of the internal configuration of each of computers shown in FIG. 1.

FIG. 2 is a block diagram showing an example of the internal configuration of each of the computers 120, 130 shown in FIG. 1.

Each of the computers 120, 130 includes a CPU 201 that executes various software and performs overall control of various modules connected to a system bus 204. These software are supplied from a ROM 202 or a hard disk (HD) 211 or a floppy® disk (FD) 212.

Each computer 120 or 130 is provided with a RAM 203, a keyboard controller (KBC) 205, a CRT controller (CRTC) 206, a disk controller (DKC) 207, and a network interface card (NIC) 208, which are the aforementioned modules.

The RAM 203 functions as a main memory, a work area, and the like of the CPU 201. The keyboard controller 205 controls instruction inputs from the keyboard (KB) 209, a pointing device, not shown, and the like. The CRT controller 206 controls the display on a CRT display (CRT) 210. The disk controller 207 controls access to the hard disk 211 and the floppy® disk (FD) 212 in which a boot program, various applications, edit files, user files, and the like are stored.

The network interface card (NIC) 208 of each computer 120 or 130 perform bidirectional data exchange with network printers, other network equipment and other computers via the LAN 100 or 102.

[Internal Configuration of MFP or SFP]

Figure 3:
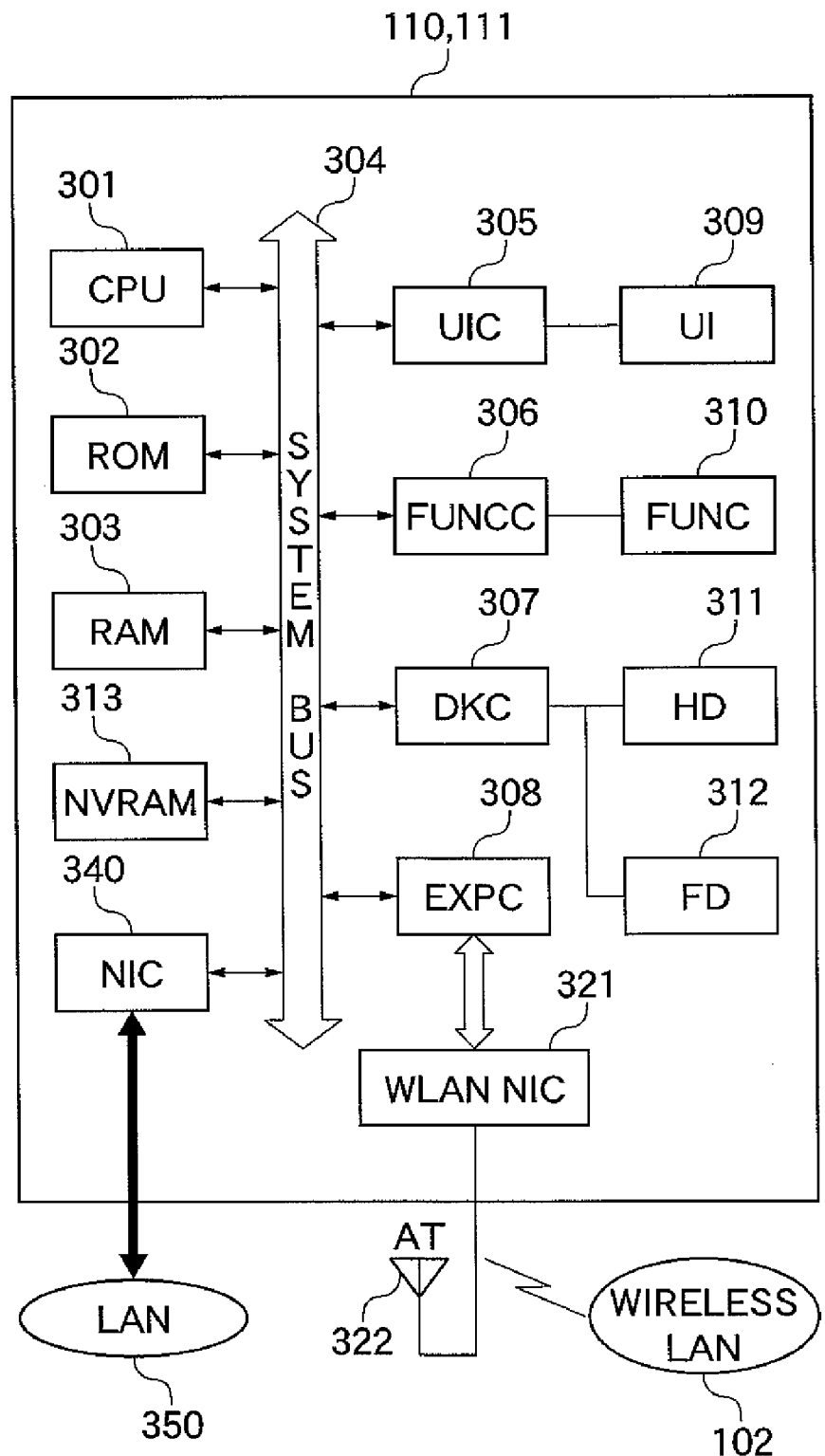
FIG. 3 is a block diagram showing an example of the internal configuration of an MFP or an SFP shown in FIG. 1.

FIG. 3 is a block diagram showing an example of the internal configuration of the MPF 111 or the SFP 110 shown in FIG. 1.

In this embodiment, each of the MPF 111 and the SPF 110 is an electronic apparatus on which a control program operates to perform processes (refer to FIGS. 6-8 which will be explained in detail below) that are features of this embodiment. The MPF and the SPF each have the internal configuration shown in FIG. 3. It should be noted that it is not inevitably necessary to constitute both the MPF 111 and the SPF 110 as the electronic apparatus. Instead, it is enough to constitute either the MPF 111 or the SPF 110 as the electronic apparatus.

The SPF 110 or the MPF 111 includes a CPU 301 for executing programs supplied from a ROM 302 or a hard disk (HD) 311 or a floppy® disk (FD) 312. These programs include a program for executing processes shown by flowcharts in FIGS. 6-8, which will be explained later. By executing the programs, the CPU 301 performs overall control of modules connected to a system bus 304.

As the modules, there are provided a RAM 303, a user interface controller (UIC) 305, a function controller (FUNCC) 306, a disk controller (DKC) 307, an expansion slot controller (EXPC) 308, an NVRAM 313, and a network interface card (NIC) 340 connected to a LAN 350.

The RAM 303 functions as a main memory, a work area, and the like of the CPU 301. The NVRAM 313 is a nonvolatile memory for storing various set values. The user interface controller (UIC) 305 controls the display on the user interface 309 and an instruction input from the user interface 309. The function controller (FUNCC) 306 controls a function unit (FUNC) 310 having a device-specific function. For example, in the case that the SFP is a monochrome printer, the function controller (FUNCC) 306 and the function unit (FUNC) 310 respectively include a monochrome print engine controller and a monochrome print engine. In the case that the SFP is a color printer, the function controller and the function unit respectively include a color print engine controller and a color print engine. The MFP has functions thereof each including the function controller 306 and the function 310.

The disk controller (DKC) 307 controls access to the hard disk 311 and the floppy® disk (FD) 312, in which a boot program, various applications, data files, and programs for executing operations that are features of this embodiment.

The expansion slot controller (EXPC) 308 performs relay control between the system bus and an expansion LAN card (hereinafter referred to as the expansion card) 321 mounted to an expansion slot I/F 320. The expansion card 321 provides the SPF 110 or the MPF 111 with a different function depending on a type of the expansion card 321. For example, the expansion card 321 provides a wireless LAN function, a data encryption function, a PDL (Print Data Language) function, or the like. The SPF 110 or the MPF 111 is adapted to be mounted with one or more expansion cards 321 to thereby attain one or more functions provided by the one or more expansion cards 321.

The expansion card 321 shown in FIG. 3 is an expansion card providing a wireless LAN function (WLAN NIC). Using this expansion card 321, the SPF 110 or the MPF 111 is connected via an antenna (AT) 322 to the wireless LAN 102 for bidirectional data exchange with other network equipment or computers.

[Construction of Expansion Card]

Figure 4:
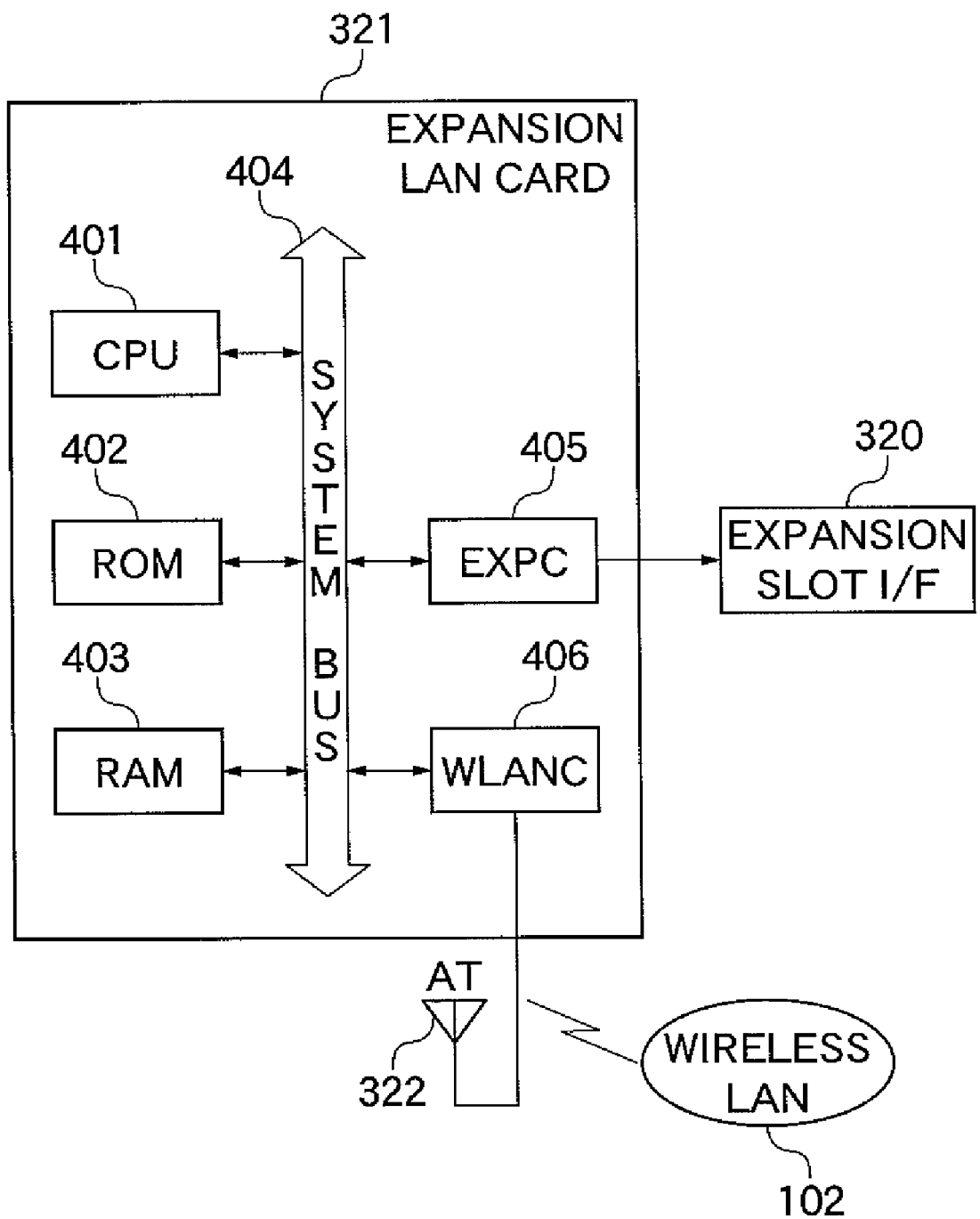
FIG. 4 is a block diagram showing an example of the construction of an expansion card shown in FIG. 3.

FIG. 4 is a block diagram showing an example of the construction of the expansion card (WLAN NIC) 321 shown in FIG. 3.

When connected to the SPF 110 or the MPF 111 shown in FIG. 3, the expansion card 321 provides it with the function of connection to the wireless LAN 102. The expansion card 321 includes a CPU 401 that executes programs stored in a ROM 402 and performs overall control of various modules which are connected to a system bus 404 and which are a RAM 403, and expansion slot controller (EXPC) 405, and a wireless LAN controller (WLANC) 406.

The RAM 403 functions as a main memory, a work area, and the like of the CPU 401. The expansion slot controller (EXPC) 405 connects the wireless LAN card 321 to the expansion slot I/F 320 for bidirectional data exchange with the SPF 110 or the MPF 111 in FIG. 3. A wireless LAN controller 406 connects the expansion card 321 to the wireless LAN 102 via the antenna (AT) 322 for bidirectional data exchange with other network equipment or computers.

[Internal Construction of Wireless LAN Access Point]

Figure 5:
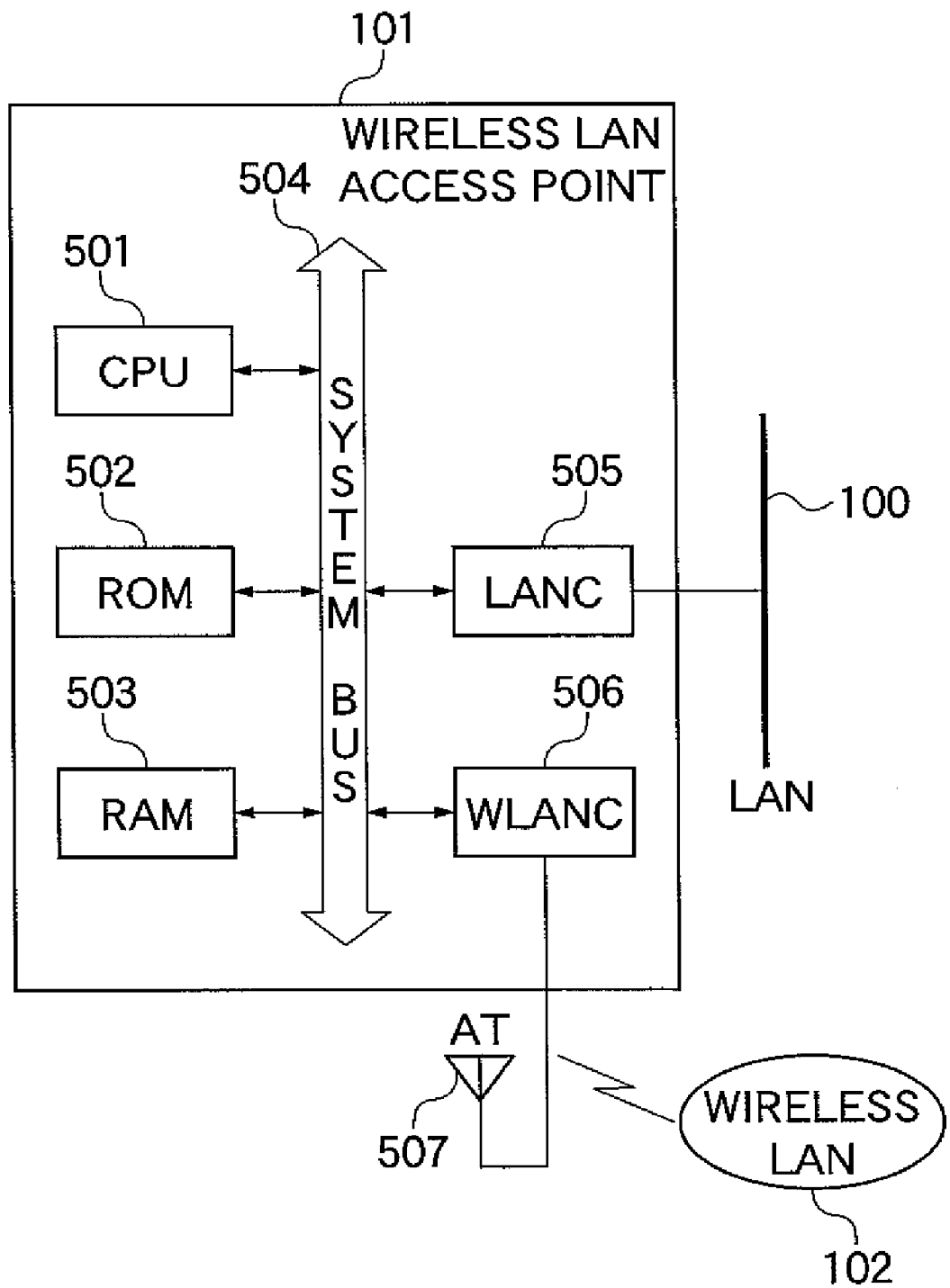
FIG. 5 is a block diagram showing the internal configuration of a wireless LAN access point shown in FIG. 1.

FIG. 5 is a block diagram of the internal configuration of the wireless LAN access point 101 shown in FIG. 1.

The wireless LAN access point 101 includes a CPU 501 that executes programs stored in a ROM 502 and performs overall control of modules connected to a system bus 504 and including a RAM 503, a LAN controller (LANC) 505, and a wireless LAN controller (WLANC) 506.

The RAM 503 functions as a main memory, a work area, and the like of the CPU 501. The LAN controller (LANC) 505 performs bidirectional data exchange with other network equipment or computers via the wired LAN 100. The wireless LAN controller (WLANC) 506 connects the access point 101 to the wireless LAN 102 via an antenna (AT) 507 for bidirectional data exchange with other network equipment or computers.

[Processes in this Embodiment]

With reference to flowcharts shown in FIGS. 6-8, processes in this embodiment will be described that are carried out by the MPF 111 or the SPF 110 in the above-described arrangement.

Figure 6:
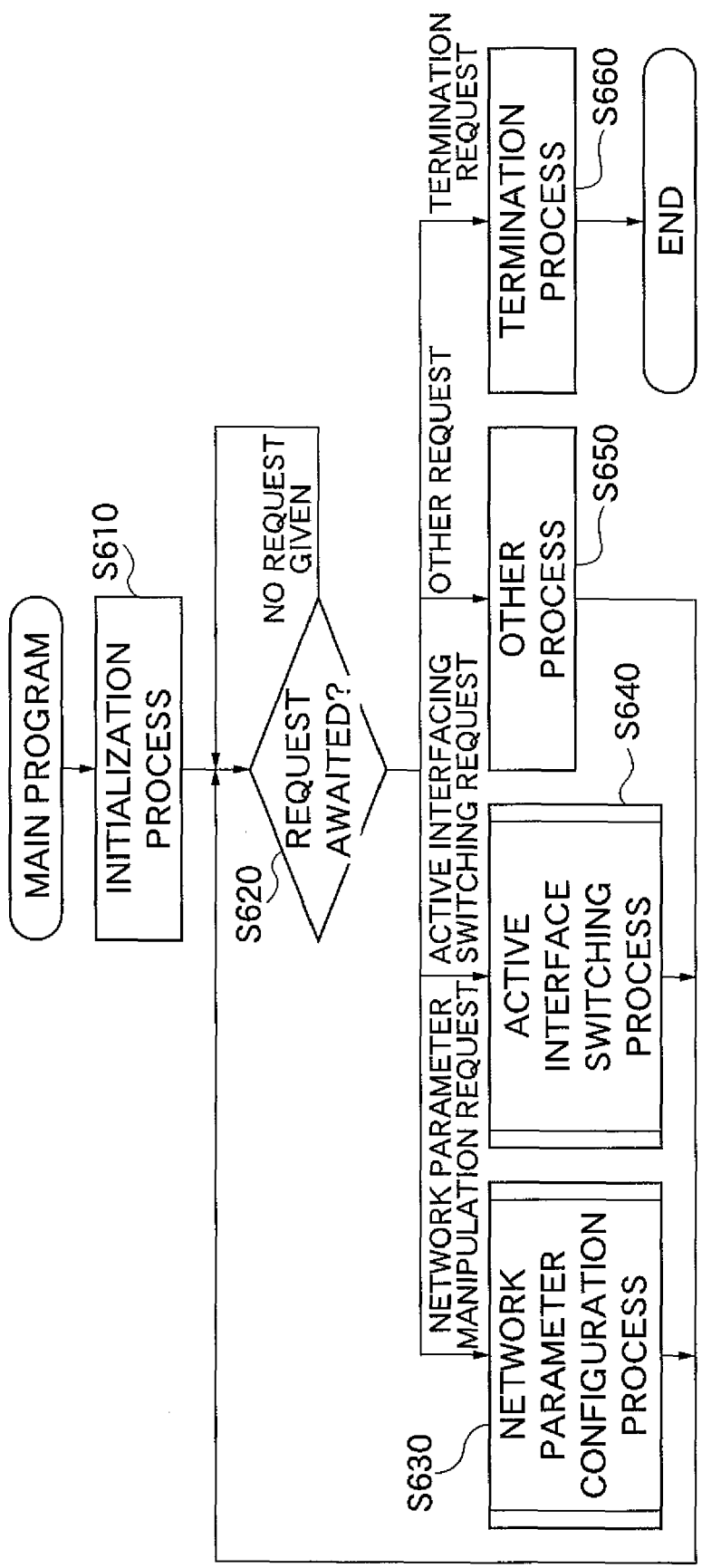
FIG. 6 is a flowchart showing a main process executed by the MFP or the SFP.

FIG. 6 is a flowchart showing a main process executed by the MPF 111 or the SPF 110. A control program for executing the main process is supplied from the ROM 302, the hard disk (HD) 310, or the floppy® disk (FD) 311 of the SPF 110 or the MPF 111, the control program being executed by the CPU 301 of the SPF or the MPF.

Referring to FIG. 6, the CPU 301 first performs initialization process (step S610) when power is on. In the initialization process, values stored in a storage area that are used for network connection control by the CPU 301 are copied into a display area used for UI control by the CPU 301. The storage area is provided in the NVRAM 313 and the display area is provided in the RAM 303, for instance, but this is not limitative. Subsequently, other initialization process is carried out, and the CPU 301 awaits for an external request (step S620).

The CPU 301 proceeds to a step S630 when externally receiving a manipulation request to manipulate network parameters, for instance, proceeds to a step S640 when receiving a request for active interface switching, proceeds to a step S650 when receiving other request, and proceeds to a step S660 when receiving a termination request. Then, the CPU 301 executes a process corresponding to the request, i.e., a network parameter configuration process (S630), an active interface switching process (S640), other process (S650), or a termination process (S660).

Upon completion of the network parameter configuration process (S630), the active interface switching process (S640), or other process (S650), the CPU 301 returns to the step S620 where it awaits for an external request. When the termination process (S660) is completed, the main program is finished.

Figure 7:
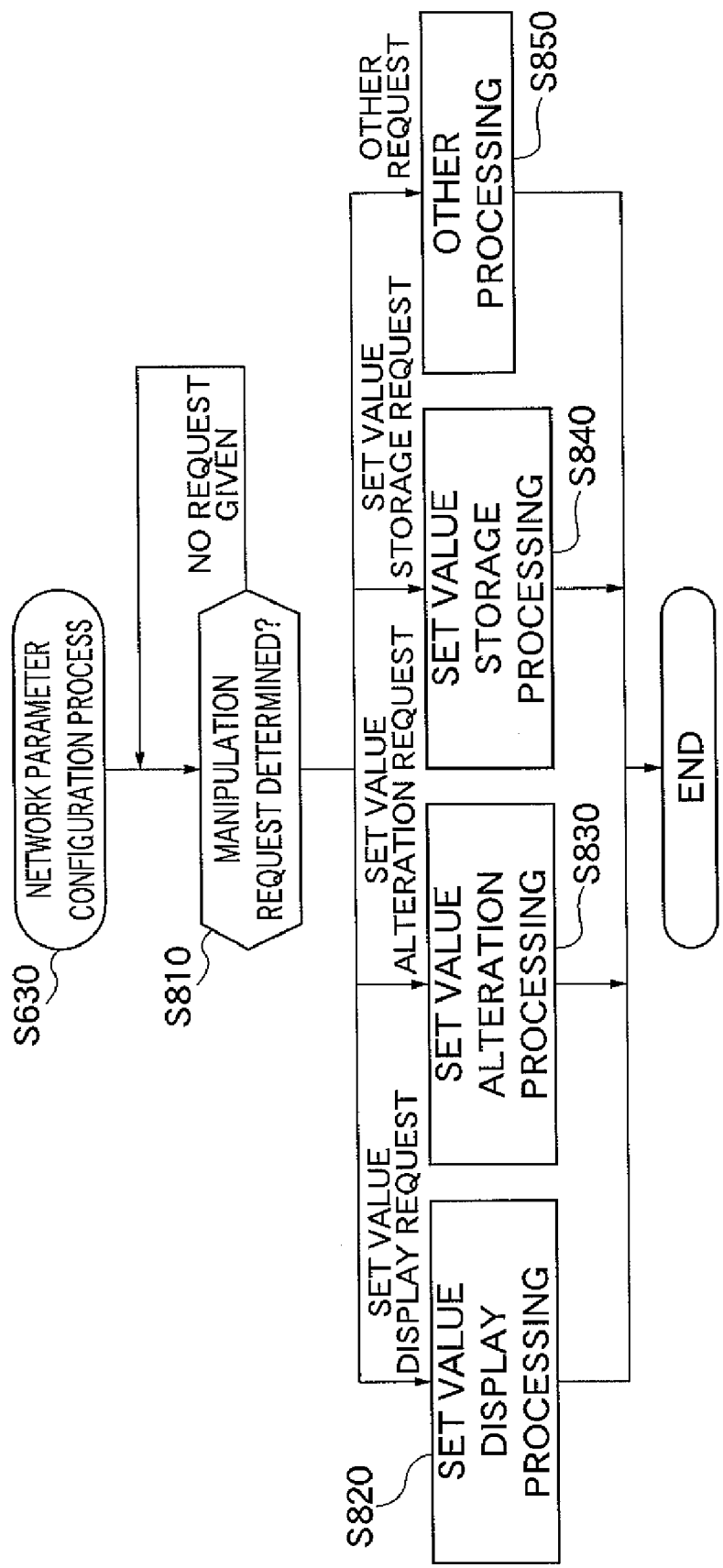
FIG. 7 is a flowchart showing in detail network parameter configuration processing at S630 in FIG. 6.

FIG. 7 is a flowchart showing in detail the network parameter configuration process at the step S630 in FIG. 6.

In the network parameter configuration process, the CPU 301 first determines the type of a manipulation request (S810) and executes processing corresponding to the type of the manipulation request. For example, the manipulation request is for manipulating parameters for the wireless LAN 102 or other network for which parameter configuration is to be performed. The process proceeds to a step S820 when the manipulation request is a request for display of set values (i.e., a set value display request), proceeds to a step S830 when the request is a request for alteration of set values (i.e., a set value alteration request), proceeds to a step S840 when the request is a request for storage of set values (i.e., a set value storage request), and proceeds to a step S850 when the request is other request. Then, processing corresponding to the manipulation request, i.e., set value display processing (S820), set value alteration processing (S830), set value storage processing (S840), or other processing (S850) is carried out.

The set value display processing (S820) is for displaying values in the display area onto the UI 309. The set value alteration processing (S830) is for changing values in the display area to requested values and for performing display processing, which is the same as the set value display processing (S820), to thereby display values currently stored in the display area onto the UI 309, whereupon the processing is terminated.

Figure 8:
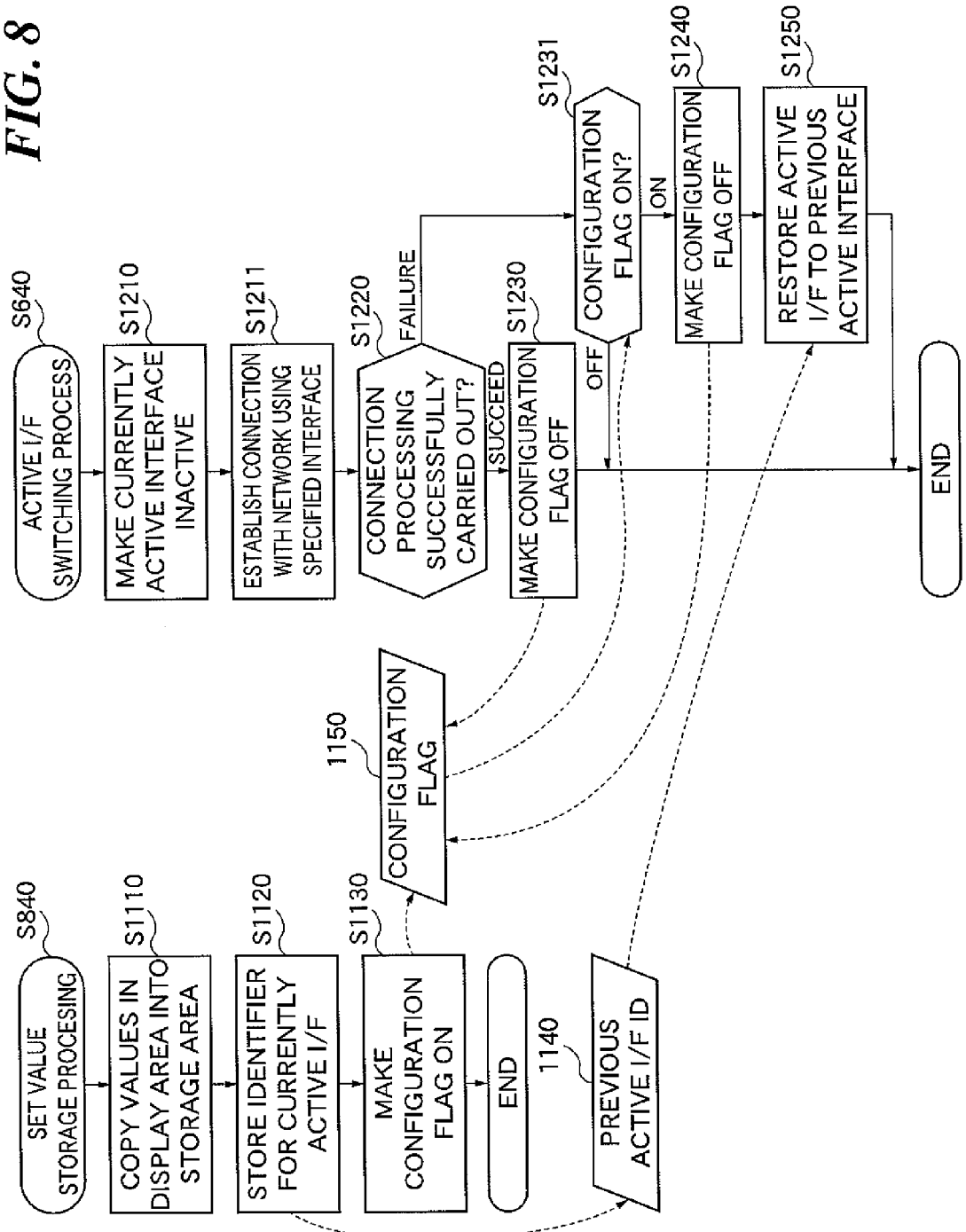
FIG. 8 is a flowchart showing in detail active interface switching processing (S640) in FIG. 6 and set value storage processing (S840) in FIG. 7.

FIG. 8 is a flowchart showing in detail the active interface switching processing (S640) in FIG. 6 and the set value storage processing (S840) in FIG. 7.

The CPU 301 uses two pieces of data 1140, 1150 in the active interface switching processing and the set value storage processing. The data 1150 is a configuration flag having a value of 0 (OFF) upon factory shipment and having a value of 1 (ON) when set values have once been stored by the set value storage processing (S840). The data 1150, i.e., the configuration flag is made OFF in the active interface switching processing. The data 1140 indicates a previous active interface ID. Specifically, in the set value storage processing, an identifier for an interface that is currently made active is stored as the previous active interface ID. In the active interface switching processing, the previous active interface ID 1140 is referred to as an identifier that indicates an interface previously made active.

It is assumed here that network parameters for the wireless LAN interface are changed by a user when the wired LAN interface is in operation. In this case, the CPU 301 copies values in the display area into the storage area in the set value storage processing (S840) whereby the values of the parameters for the wireless LAN interface, for instance, which have been changed by the user in the set value alteration processing (S830), are stored in the storage area (S1110). Next, the identifier for the currently active interface (the wired LAN interface, for instance) is stored as the previous active interface ID 1140 (S1120). Then, a configuration flag 1150 indicating that network parameters have been changed is made ON (S1130). After completion of the processing in the step S1130, the set value storage processing (S840) is finished.

It is assumed here that the user switches the active interface from the wired LAN interface to the wireless LAN interface. In the active interface switching processing (S640), the CPU 301 first makes the currently active interface (the wired LAN interface, for instance) inactive (S1210), and then attempts to establish connection with a network using a specified interface (the wireless LAN interface, for instance) (S1211). In this example, the CPU carries out the connection processing for connecting the wireless LAN 102 to the network. Specifically, in the case that the active interface is changed from the wired LAN interface to the wireless LAN interface, the connection processing to connect to the access point 101 is carried out using the wireless LAN 102.

The CPU 301 proceeds to a step S1230 when determining that the connection processing has successfully been carried out (S1220), but proceeds to a step S1231 when determining that the connection processing has failed. In the step S1230, the configuration flag 1150 is made OFF to thereby complete the active interface switching processing since the active interface has been changed from the wired LAN interface to the wireless LAN interface. As a result, when there is a failure in the next or subsequent connection processing, the active interface is prevented from being automatically altered.

On the other hand, when the process proceeds to the step S1231, the CPU 301 assigns processing in accordance with the value of the configuration flag 1150. When the configuration flag 1150 is kept at a value of 1 (ON), the CPU determines that the network connection just after the change of the configuration of network parameters has failed, and makes the configuration flag 1150 OFF (S1240). Whereupon the active interface is restored to the interface indicated by the previous active interface ID 1140 (S1250) and then the active interface switching processing is completed. When it is determined at the step S1231 that the configuration flag 1150 is OFF, the active interface switching processing is completed without performing any further processing.

Figure 9:
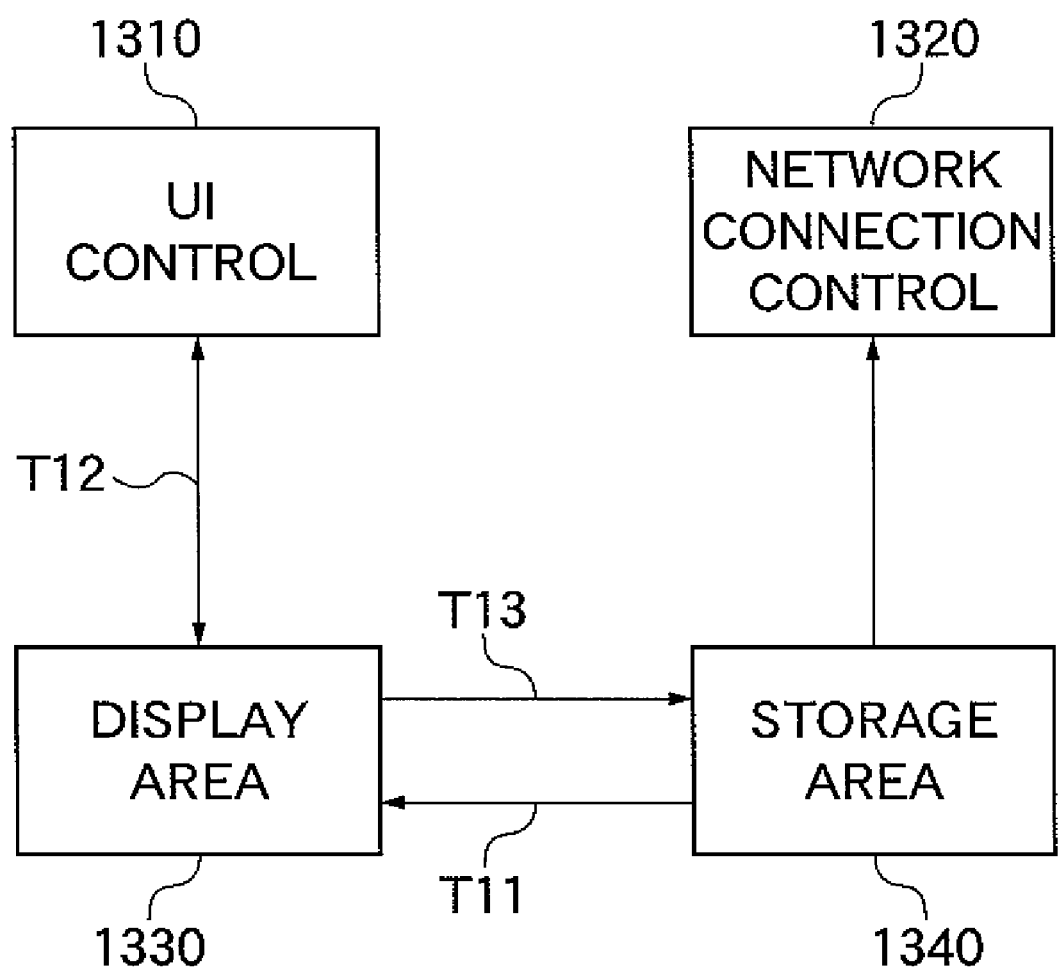
FIG. 9 is a block diagram showing a relationship between UI Control, network connection control, display area, and storage area.

FIG. 9 is a block diagram showing a relationship between UI Control, network connection control, display area, and storage area.

The UI control 1310 shown in FIG. 9 is carried out by the CPU 301 of the SPF 110 or the MPF 111, whereas the network connection control 1320 in FIG. 9 is carried out by the CPU 401 of the expansion card 321.

In the UI control 1310, the set values in the display area 1330 are manipulated. Specifically, the values of the display area 1330 are displayed on the UI 309, and then the values of the display area 1330 are configured in accordance with user's manipulation. The UI control 1310 not only controls the display or alteration of the values on the UI 309 but also controls the display or alteration of values that is performed via network. For example, the UI control 1310 transmits, via the network, HTML (Hyper Text Markup Language) data for a configuration screen and causes a web browser to display the configuration screen (hereinafter referred to as the remote UI). Using the configuration screen displayed on the web browser, the user confirms and changes the set values. The network connection control 1320 uses values in the storage area 1340. Specifically, the values in the storage area 1340 are used as network parameters for network connection.

As described above, in the initialization process (S610), the CPU 301 copies values in the storage area 1340 into the display area 1330, as shown by T11 in FIG. 9. In the set value display processing (S820), the CPU 301 causes the UI control 1310 to display values in the display area 1330 onto the UI 309 as shown by T12. In the set alteration processing (S830), the CPU changes the values in the display area 1330 to requested values. Then, the CPU 301 copies the values in the display area 1330 into the storage area 1340 as shown T13 in the set value storage processing (S840).

[Advantages of this Embodiment]

In a case that, by means of the remote UT using the currently active interface (the wired LAN interface, for instance), network parameters for a different network interface (the wireless LAN interface, for example) mounted to the SPF 110 or the MPF 111 are configured, the following advantages are attained. It is assumed here that the parameters for the wireless LAN interface have erroneously been configured but nevertheless the active interface is changed from the wired LAN interface to the wireless LAN interface.

Even in such a case, when the SPF 110 or the MPF 111 recognizes that network connection using the wireless LAN interface has failed, the active interface can be restored to the wired LAN interface which is the previous interface. As a result, the SPF 110 or the MPF 111 can be prevented from being isolated from the network. Moreover, the network parameters for the interface with which the failure has occurred in the connection can be corrected through the remote UI using the active interface.

[Memory Map in Storage Medium of This Embodiment]

Figure 10:
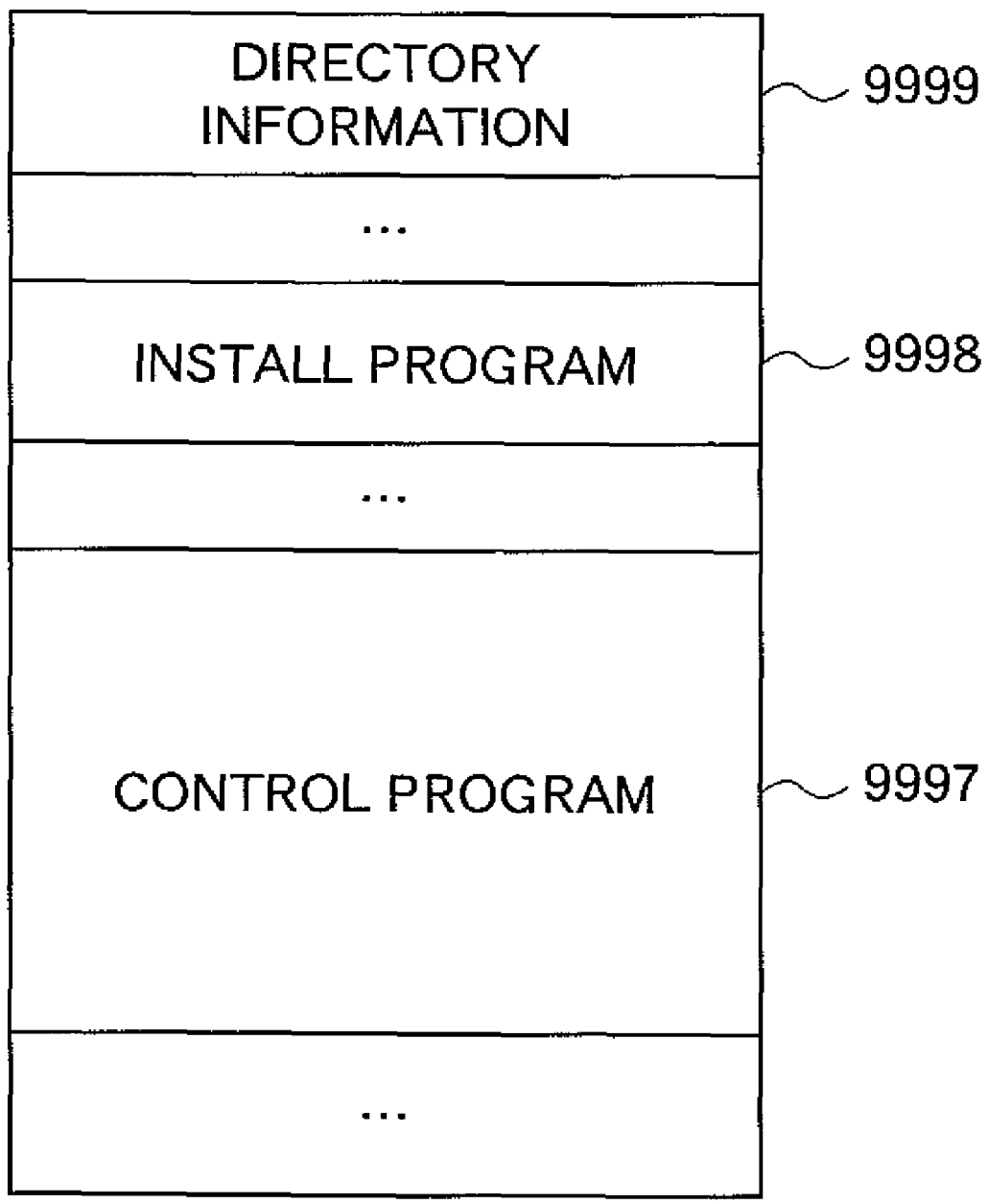
FIG. 10 is a map diagram showing an example of a memory map of a storage medium in which a control program for performing processes shown in FIGS. 6-8.

FIG. 10 is a map diagram showing an example of a memory map of a storage medium in which the control program for performing the processes shown in FIGS. 6-8 is stored.

This storage medium is formed by a CD-ROM, for instance. The storage medium has a storage area in which are provided a first area 999 for storing directory information, a second area 9998 for storing an install program, and a third area 9997 for storing the control program.

The directory information stored in the first area 9999 of the storage medium is information indicating positions of the second and third areas 9998, 9997 in the storage area of the storage medium. The install program stored in the second area 9998 is a program for installing the control program.

The control program is installed into the SPF 110 or the MPF 111 by the following procedures. First, the install program stored in the second area 9998 of the storage medium is loaded into the system. Next, the install program is executed by the CPU 301. As a result, the control program is read out from the third area 9997 of the storage medium and stored in the hard disk 311.

In the above example, the case where the control program is installed into the SPF 110 or the MPF 111 has been described. However, the control program can be installed into the expansion card 321 in a similar manner. In that case, the control program is stored in the ROM 402.

The present invention may either be applied to a system composed of a plurality of pieces of equipment (for example, a system or an integrated apparatus comprised of a host computer, interface equipment, reader, and the like) or to an apparatus comprised of a single piece of equipment.

Further, it is to be understood that the present invention may also be accomplished by supplying a system or an apparatus with a storage medium in which a program code of software, which realizes the functions of the above described embodiment, is stored, and causing a computer of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy® disk, a hard disk, a magnetic-optical disk, an optical disk such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, this invention is of course also applicable to a case where a program is distributed via network from a storage medium in which is stored a program code of software for realizing the functions of the above-described embodiment.

While the present invention has been described with reference to exemplary embodiments, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2006-094623, filed Mar. 30, 2006, which is hereby incorporated by reference herein in its entirety.

What is claimed is:

1. An apparatus comprising:
 a first network interface arranged to connect to a network via a wireless connection;
 a second network interface arranged to connect to the network via a wired connection;
 an interface controller device arranged to receive a request to switch an active network interface in the apparatus to the first network interface;
 a changing device arranged to change at least one set value for the first network interface;
 a first interface switching device arranged to switch the active network interface in the apparatus from the second network interface, when the second network interface is successfully connected to the network via the wired connection, to the first network interface in response to the request;
 a connection processing device arranged to perform processing to establish connection to the network using the first network interface; and
 a second interface switching device arranged to restore connection to the network via the wired connection by switching the active network interface in the apparatus back to the second network interface in a case that the set value for the first network interface has been changed by said changing device and the processing to establish connection to the network using the first network interface by said connection processing device has failed.

2. The apparatus according to claim 1, including:
 a storage device arranged to store an identifier for the second network interface and information indicating that the set value for the first network interface has been changed, in a case that the set value for the first network interface has been changed by said changing device;
 wherein, in a case that the information indicating that the set value for the first network interface has been changed has been stored and the processing to establish connection to the network by the connection processing device has failed, said second interface switching device switches the active network interface in the apparatus to the second network interface indicated by the identifier and erases the information indicating that the set value for the first network interface has been changed.

3. The apparatus according to claim 2, including:
 an information erasing device arranged to erase the information indicating that the set value for the first network interface has been changed, in a case that the processing to establish connection to the network by the connection processing device has succeeded.

4. The apparatus according to claim 2, wherein, in a case that the information indicating that the set value for the first network interface has been changed has not been stored and the processing to establish connection to the network by the connection processing device has failed, said second interface switching device does not switch the active network interface in the apparatus to the second network interface indicated by the identifier.

5. A network configuration method implemented by a data processing system for an apparatus in which a plurality of network interfaces including a first and a second network interface can be used, the method comprising:
 a receiving step of receiving a request to switch an active network interface in the apparatus to the first network interface, the request being received through an interface controller device, and the first network interface arranged to connect to a network via a wireless connection;
 a changeover step of changing at least one set value for the first network interface;
 a first interface switching step of switching the active network interface in the apparatus from the second network interface, when the second network interface is successfully connected to the network via a wired connection, to the first network interface in response to the request;
 a connection processing step of performing processing to establish connection to the network using the first network interface; and
 a second interface switching step of restoring connection to the network via the wired connection by switching the active network interface in the apparatus back to the second network interface, in a case that the set value for the first network interface has been changed in said changeover step and the processing to establish connection to the network using the first network interface in said connection processing step has failed,
 wherein the first network interface and the second network interface are provided within the apparatus.

6. A non-transitory computer-readable memory storing a control program that when executed by a computer causes the computer to execute a network configuration method for an apparatus in which a plurality of network interfaces including a first and a second network interface can be used, the network configuration method comprising:
 a receiving step of receiving a request to switch an active network interface in the apparatus to the first network interface, the request being received through an interface controller device, and the first network interface arranged to connect to a network via a wireless connection;
 a changeover step of changing at least one set value for the first network interface;
 a first interface switching step of switching the active network interface in the apparatus from the second network interface, when the second network interface is successfully connected to the network via a wired connection, to the first network interface in response to the request;

a connection processing step of performing processing to establish connection to the network using the first network interface; and a second interface switching step of restoring connection to the network via the wired connection by switching the active network interface in the apparatus back to the second network interface, in a case that the set value for the first network interface has been changed in said changeover step and the processing to establish connection to the network using the first network interface in said connection processing step has failed, wherein the first network interface and the second network interface are provided within the apparatus.

* * * * *